UNITED STATES PATENT OFFICE 2,606,877

PROCESS OF REACTING AN ORGANIC COMPOUND OF ALUMINUM AND/OR MAGNESIUM WITH A GROUP IV HALIDE TO FORM A CATALYST

James P. West, Westmont, Ill., assignor to Universal Oil Products Company, Chicago, Ill., a corporation of Delaware No Drawing. Application December 27, 1949, Serial No. 135,292

15 Claims. (Cl. 252—432)

This invention relates to the preparation of catalytic composites containing one or more metal oxides and consisting of alumina and/or magnesia composited with an oxide of certain elements selected from group IV of the periodic table, the resulting composites being catalytically active in promoting hydrocarbon conversion reactions, and particularly hydrocarbon cracking reactions for the production of gasoline motor fuels from petroleum charging stocks. More specifically, this invention concerns catalytically active, refractory composites comprising an oxide of a metal or metalloid selected from the elements of group IV of the periodic table and at least one member selected from the group consisting of alumina and magnesia, said oxides being composited by means of a metathesis reaction between a halide of said group IV elements and a weak organic acid salt of aluminum and/or magnesium at selected reaction conditions.

Refractory metal oxide composites, and particularly silica-base composites, containing alumina and/or magnesia in intimate association therewith have been widely known and utilized by the prior art as catalysts for effecting specific hydrocarbon conversion reactions, such as the cracking of high molecular weight petroleum hydrocarbons for the production of motor fuel gasolines therefrom. These catalysts, however, which have been invariably prepared by procedures which involve compositing the metal oxides in the presence of an aqueous solvent or suspension medium are characterized generally by their relatively dense structure in comparison with the catalysts of the present invention. In an exemplary illustration, one of such methods in present common commercial use involves precipitating a silica gel from an aqueous solution of an alkali metal silicate and impregnating the gel so formed with an aqueous solution of an aluminum and/or magnesium salt followed by converting the latter salt or salts to the corresponding oxides. These catalysts and others containing oxides of the elements of group IV, as presently prepared not only possess the disadvantage of having relatively high densities but are also generally contaminated with foreign metallic components which reduce the activity of the catalysts in catalytic reactions or otherwise adversely effect the physical properties of the catalyst particles. The use of catalysts having low densities and high porosities accompanied by the general desirable property of high activities has become increasingly important since the advent of fluidized processes in the treatment of petroleum fractions, such as the fluidized process for catalytically cracking gas oil fractions. Highly porous catalysts of low density are particularly desirable in fluidized catalytic conversion processes because of the ease of maintaining the catalyst in suspension or "fluidization" in the reactant vapors during the process and the accompanying increased yields of conversion products attending their use. The silica-base catalysts prepared in accordance with the present process are characterized by their porosity and their relatively low density, which properties particularly qualify the use of the catalyst in fluidized catalytic conversion reactions. One of the primary objectives of the present invention is the preparation of a catalyst possessing the aforementioned properties.

Another object of this invention is to provide improved silica-base catalysts containing alumina and/or magnesia free of foreign impurities which normally tend to reduce the catalytic activity and life of the catalyst composite.

In one of its embodiments this invention concerns a process for the preparation of a hydrocarbon conversion catalyst comprising a composite of an oxide of at least one of the elements of group IV of the periodic table and particularly silicon, titanium, zirconium, cerium, hafnium and thorium and an oxide selected from the group consisting of alumina and magnesia which comprises reacting a halide of at least one of the elements of the former group with a salt of at least one of the metals of the group consisting of aluminum and magnesium in which salt said metal is joined to an organic radical through an oxygen atom.

In another of its embodiments the present invention relates to a process for the preparation of a hydrocarbon conversion catalyst comprising a composite of silica and at least one oxide selected from the group consisting of alumina and magnesia which comprises reacting a silicon halide of a halogen having an atomic weight greater than 19 with at least one metal salt selected from the group consisting of the magnesium and aluminum salts wherein said metal is joined to an organic radical through an oxygen atom.

Still another embodiment of the invention relates to a process for the production of a hydrocarbon conversion catalyst comprising a composite of silica and at least one oxide selected from the group consisting of alumina and magnesia which comprises reacting a silicon halide of a halogen having an atomic weight greater than 19 with at least one metal salt selected from the group consisting of the magnesium and aluminum salts of an acid of the fatty acid series.

A more specific embodiment of the present invention concerns a process for the preparation of a hydrocarbon conversion catalyst comprising a composite of silica, boron oxide and at least one oxide selected from the group consisting of alumina and magnesia which comprises reacting a silicon tetrachloride with a mixture of an aliphatic alcohol ester of boric acid and at least one metal salt selected from the group consisting of the magnesium and aluminum alkoxides at a temperature of from about 150° to about 300° C. and at a pressure sufficient to maintain at least a portion of the reactants in substantially liquid phase.

Other objects and specific embodiments of the present invention will be referred to in greater detail in the following further description of the invention.

The catalyst composites of the present invention containing an oxide of an element of group IV of the periodic table as a component common to all of said composite catalysts, are prepared by means of metathesis-type of reaction between a halide of said group IV element in which the halogen groups have an atomic weight greater than 19 and a salt of a weakly acidic organic compound containing oxygen and a metal-replaceable hydrogen atom selected from the aluminum and magnesium salts thereof. The halide reactant in the metathesis reaction of the present process is limited to compounds containing halogen radicals above fluorine in atomic weight because of the general inoperability of the fluorides and mixed fluorides in the reaction. These latter are highly corrosive to apparatus fabricated from the common structural metals and other fabricating materials, are generally undesirable non-liquids at the common operating pressures and temperatures and are non-reactive to the extent of the fluoride radicals in the metathesis reaction and at the conditions of operation herein concerned. Beyond the above general limitations on their selection, the halides may be selected from the uniform or mixed halogen substituted members of the indicated group IV elements. Thus, suitable halogen substituted silicon compounds utilizable in the present metathesis reaction include such typical compounds as silicon tetrachloride, silicon tetrabromide, silicon tetraiodide, silicon tribromide, silicon bromotrichloride, silicon dibromodichloride, silicon tribromochloride, silicon trichloride, silicon oxychloride, silicon di-iodide, silicon hexaiodide, silicon iodotrichloride, mono-chlorosilane, tribromo-silane, tri-chlorosilane, dibromosilane, dichlorosilane, etc. Typical compounds of other group IV elements utilizable in the present process include, for example, titanium tetrabromide, titanium trichloride, titanium tetrachloride, zirconium tetrabromide, zirconium tetrachloride, cerous chloride, cerous oxychloride, thorium tetrabromide, thorium tetrachloride, and others containing group IV elements which in general, possess the common property of having the capacity to form coordinate covalences. It is evident that the halides of the group IV elements specified above are metals or metal-like substances and are referred to herein as "metal and metalloid halides." In general, the silicon halides constitute the preferred group IV reactants utilizable in the present process because of their general availability and the desirable catalytic properties of the composites prepared therefrom in accordance with the present process. The silicon tetrahalides of the halogens above fluorine in atomic weight are further preferred because of the greater ease of maintaining these compounds in liquid phase at relatively mild pressures and, consequently, they are generally more readily adapted to the present process. Further preference is accorded the uniform or mixed tetrahalides of silicon because of their generally greater reactivity with the aluminum and/or magnesium salt reactant in the present process and hence their tendency to produce greater yields of the silica-alumina and/or magnesia composite.

The reactant utilized in the formation of the present catalytic metal oxide composites referred to herein as a salt of a metal selected from at least one of the group consisting of aluminum and magnesium wherein the salt is a compound in which said metal is joined to an organic radical through an oxygen atom are preferably the salts of the monocarboxylic acids selected from the members of the fatty acid series, although aluminum and/or magnesium salts of other weakly acidic organic compounds containing oxygen and a metal replaceable hydrogen atom, such as the aliphatic alcohols, the phenols etc., may likewise be utilized. Suitable aluminum and/or magnesium salts of weak organic acids containing an oxygen atom joined to the aluminum and/or magnesium group are the various carboxylic acid salts such as the formates, acetates, the trichloroacetates, dichloroacetates, the monochloroacetates, the oxalates, the malonates, the succinates, the tartarates, the benzoates and homologs thereof. Such magnesium and aluminum salts of weak organic carboxylic acids are generally prepared by reacting the corresponding oxide ores with the particular acid desired at a temperature above about 150° C., preferably from about 180° to about 250° C., in the presence of an excess of the acid, generally from about 6 to 1 to about 12 to 1 molar proportions of the acid to the metal oxide ore. The product in the case of reacting alumina with the carboxylic acid is generally a mono-basic aluminum salt of the acid, while in the case of the reaction of magnesia with the carboxylic acid, the di-acid salt of magnesium is formed in the presence of an excess of the acid. The preferred salts in the metathesis reaction for the production of the present catalyst composite are the aluminum and magnesium acetates and formates.

Other aluminum and magnesium salts of weakly acidic organic oxygen-containing compounds wherein the metallic ion is joined to an organic radical through an oxygen group are represented by the hydroxyl compounds containing a weakly acidic hydrogen atom, such as the aliphatic alcohols and the phenols. Aluminum and magnesium alkoxides and phenolates may be prepared by any suitable method, a particularly preferred procedure comprising heating an aliphatic alcohol, preferably a member of the lower alcohol series containing fewer than about 6 carbon atoms per alcohol molecule, such as methanol, ethanol, propanol, isopropanol, butanol etc., with aluminum or magnesium at a temperature generally of the order of about 120° C., or higher, depending upon the alcohol utilized, and if desired, in the presence of a catalyst selected from the soluble mercuric salts, such as mercuric chloride. The resulting aluminum alkoxide or phenolate is separated from the reaction mixture, preferably by distillation therefrom at subatmospheric pressures, generally below about 100 mm. mercury absolute. When it is desired to prepare an ultimate catalytic composite containing both alumina and magnesia, a mixture of magnesium and aluminum alkoxides or phenolates may be prepared simultaneously by reacting an alloy of the metals or a mere physical mixture of particles of the metals with the desired alcohol or phenol.

The metathesis reaction of a halide of an element selected from the aforementioned members of group IV of the periodic table with a magnesium and/or aluminum salt of a weakly acidic organic compound containing oxygen to form a catalytically active composite containing the oxide of the group IV element, magnesia and/or alumina, depending upon whether a magnesium or aluminum salt individually or a mixture of said salts is employed in the metathesis reaction, is effected at temperatures in the range of from about 150° to temperatures below the normal decomposition point of the metal salt, generally about 300° C., and preferably at temperatures of from about 200° to about 250° C. The reaction mixture is preferably maintained under sufficiently superatmospheric pressure to provide substantially liquid phase conditions within the reaction mixture, generally up to about 100 atmospheres. Such pressures may be obtained in the reactor by charging an inert gas, such as nitrogen, carbon monoxide, etc., into the reactor at the desired pressure prior to heating the mixture to the reaction temperature. The proportion of the respective reactants utilized in the metathesis reaction, that is, the metal or metalloid halide and the salt or salts of magnesium and/or aluminum, is dependent upon the ultimate composition desired in the final catalyst. Desirable and highly effective hydrocarbon cracking catalysts usually contain from about 0.1 to about 35% by weight of combined alumina and/or magnesia in the final catalysts, preferably from about 2 to about 10% of the combined weight thereof. In order to obtain a final composite containing the desired proportion of metal and metalloid oxide components, a theoretical proportion of the initial reactants will yield the final composition almost quantitatively from the initial charge of reactants to the metathesis reaction. In a typical reaction utilizing silicon tetrachloride, for example, as the component of the metathesis reaction yielding the silica component of the ultimate catalyst composite, one mole of the silicon tetrachloride or approximately one hundred seventy weight equivalents thereof will yield one mole of silicon dioxide or approximately 60 weight equivalents thereof. Similarly, a molar equivalent of an aluminum salt, such as mono-basic aluminum acetate or aluminum ethoxide, will yield ½ mole of alumina or approximately 51 weight equivalents thereof. It is not to be assumed, however, that exact molar equivalents of the silica-yielding reactant and the magnesia or alumina-yielding reactant need necessarily be employed in the metathesis reaction, since the reaction proceeds in the presence of a molar excess of either reactant and the proportion thereof desired will ultimately depend upon the desired composition of the final catalyst composite.

The product of the initial metathesis reaction between the metal or metalloid halide and the magnesium and/or aluminum salt or salts normally contains an excess of at least one of the reactants which, unless exact molar equivalents of said reactants are utilized in the reaction, is usually present to some extent in the product of the metathesis reaction. Thus, in the preparation of a typical hydrocarbon cracking catalyst containing alumina and silica in the proportions of from about 0.1 to about 15% by weight of alumina and from about 99.9 to about 85% by weight of silica, a stoichiometric ratio of the reactants must either be charged to the initial metathesis reaction and the excess therein subsequently converted to silica, or silica, previously formed, added to the metathesis reaction mixture to increase the proportion of silica to the desired value for preparation of catalysts. It is generally preferred, however, in the preparation of a catalytic composite by means of the present process to charge an excess of the silica-yielding reactant, that is a silicon halide, to the metathesis reaction and thereafter converting the silicon halide by a suitable secondary reaction to the desired silica component. Whether an excess or unconverted portion of the metal or metalloid halide or the aluminum and/or magnesium salt is present in the product of the initial metathesis reaction, the portion unreacted to the corresponding metal oxide may be converted thereto by subsequently heating the metathesis reaction mixture to a somewhat higher temperature, preferably in the presence of water, under a relatively high pressure to hydrolyze the unconverted reactant to the corresponding metal oxide or hydroxide. Where the unconverted reactant is a silicon halide, as is usually the case in the preparation of a silica-alumina and/or magnesia catalyst for hydrocarbon cracking purposes, heating of the metathesis reaction mixture ordinarily effects decomposition or hydrolysis of the excess silicon halide to silicon dioxide which becomes intimately admixed with the oxides formed by the metathesis reaction and the desired catalytic composite is ultimately recovered. The indicated thermal or hydrolytic decomposition of the unconverted portion of the metathesis reaction mixture is usually effected in a closed system under pressure and at temperatures of from about 150° to about 350° C. to substantially free the reaction residue of volatile matter. Where hydrolysis is the means utilized to effect complete conversion of the excess reactants to their corresponding oxides, water in sufficient quantity to hydrolyze the remaining metal or metalloid halide or any residue of aluminum and/or magnesium salt is added to the reaction mixture and heated in the closed system at a super-atmospheric pressure. The organic residues of the metal oxide forming salts and reactants present in the excess of unconverted reactants are largely volatile and therefore are released from the reaction mixture following the completion of the secondary heating or hydrolytic reaction. The volatilization and, therefore, the removal of all organic residues from the composite formed in the metathesis reaction, leaves no residue of alkali metal, alkaline earth metal or other metallic impurities in the final catalyst composite of the metal and/or metalloid oxides which may otherwise undesirably affect the catalytic properties of the desired composite, and this feature of the present method of preparing such composites constitutes one of the primary advantages thereof over other methods of preparation. The composite of oxides formed in the metathesis reaction therefore require no extensive washing treatment, soaking in acid or ammonium salt solutions, or other special handling procedures commonly employed by the art for the removal of alkali metals and other foreign metallic impurities from the composite of oxides.

Upon completion of the thermal or hydrolytic decomposition of the unconverted reactants, if any, present in the product of the metathesis reaction, the resulting composite of oxides usually a white, friable solid mass, is heated at a higher temperature to calcine the intimately associated mixture of oxides and activate the composite for catalytic purposes. In the latter calcination, the reaction mass is heated to temperatures of from about 500° to about 800° C., usually in the presence of oxygen, such as a stream of air, which oxidizes any of the remaining organic residue to volatile products, thus removing the organic matter from the catalyst reaction mixture and eliminating the same from the final catalytic composite. The resulting product may be ground to a powder and subsequently pelleted into pills of desired size for use in a hydrocarbon conversion reaction or the original shape of the mass may be retained in its porous condition for use in the reaction.

The present method of preparing catalyst composites by metathesis-type of reaction essentially accounts for the unusually low density and high porosity characteristics of the present composites. Likewise, the catalysts herein prepared, being free of deactivating foreign components, have higher activities and withstand repeated regeneration more effectively than has been observed in the case of even the best of the catalysts of the prior art wherein methods of preparation involving the introduction of alkali metal ions into the process procedure result in catalysts in which said foreign alkali metal ions are invariably present. The final calcination of the composite of metal oxides formed in the prior metathesis reaction, while in its porous state, results in the formation of a structurally rigid, although still porous, catalyst particle, capable of withstanding considerable surface pressure before crumbling of the catalyst particle occurs.

The present metal and metalloid oxide composites as catalysts in hydrocarbon cracking reactions are made more effective catalytically by the incorporation of boron oxide as a component of the catalyst composite in intimate association with the oxides of at least one of the group IV elements, alumina and/or magnesia present in the catalyst. The boron oxide content of such catalysts to be effective in enhancing the catalytic properties of such composites is usually from about 2 to about 10% by weight of the ultimate composite although it may advantageously be present in amounts up to about 30% by weight thereof. Boron oxide may be incorporated as a component of the composite by adding to the metathesis reaction mixture a boron salt of a weakly acidic organic oxygen-containing compound in which the boron ion is attached to the organic portion of the molecule through an oxygen atom. Thus, the alcohol esters of boric acid, and particularly the aliphatic alcohol esters thereof, may be added to the initial metathesis reaction involving the metal and/or metalloid halide and the aluminum and/or magnesium salt or salts, the alcohol ester of boric acid undergoing a metathesis-type of reaction with the halide salt component in a manner similar to the aluminum and/or magnesium salts, present in the reaction mixture. The boron compound yielding the boron oxide component of the catalyst composite, since it is incorporated into the initial metathesis reaction mixture becomes intimately associated with the other oxides present in the composite, presumably in the form of a complex salt therewith which does not readily lose its content of boron oxide in the subsequent use of the catalyst composite at high temperatures, as for example, in a conversion process such as a catalytic cracking reaction. In this latter respect the catalysts prepared by means of the present metathesis type of reaction are advantageously stable and do not lose boron oxide at high temperatures, a property which peculiarly distinguishes the present catalyst product from boron oxide-containing catalysts previously prepared by means other than the process of this invention.

Typical boron salts of weakly acidic organic compounds containing oxygen and a metal-replaceable hydrogen atom are such compounds as tri-methoxyboron, tri-ethoxyboron, tri-propoxyboron, tri-isobutylborate, tri-isoamylborate, and salts of higher alcohols in the homolgous series, as well as mixed alcohol esters of boric acid such as ethoxy-di-methoxyboron, etc. The esters of boric acid leave no metallic oxide residue in the finished catalyst composite other than boron oxide during the metathesis reaction and are therefore not responsible for depositing other metallic impurities on the catalyst composite which may adversely effect the catalytic properties of the ultimate catalyst. These compounds also decompose to boron oxide thermally or hydrolytically in the secondary stage following the metathesis reaction and if an excess or other unconverted portion of the boron salt remains in the product of the metathesis reaction, the latter may thus be converted to boron oxide by the thermal or hydrolytic treatment as in the case of converting an excess or unconverted portion of a silicon halide or aluminum and/or magnesium salt residue to their corresponding oxides by subsequent treatment.

The process of the present invention is further illustrated in the following examples which are limited to the preparation of specific catalysts and are not intended to define the scope of the invention in strict accordance thereto.

EXAMPLE I

A silica-alumina catalyst composite is prepared by means of the following procedure: 162 grams (1 mole) of mono-basic aluminum acetate in a finely powdered dry condition is mixed with 1300 grams (approximately 7.5 moles) of silicon tetrachloride in a rotating pressure autoclave and heated to a temperature of about 200° C. under a nitrogen pressure of 100 atmospheres for 4 hours, the contents of the reactor being thoroughly mixed by rotation of the autoclave. The reactor contents, consisting of a white amorphous solid mass, is then heated to distill over a mixture of organic liquid products including acetone and compounds containing organically bound chlorine. The dry residue is then heated in the presence of 500 cc. of water to a temperature of approximately 120° C. for 2 hours. The mixture is then filtered to remove a major proportion of the water and the filter cake dried at 150° C. for 2 hours. The dried residue is thereafter calcined at a temperature of 500° C. for 6 hours and subsequently ground to pass a 20 mesh size screen. Approximately 540 grams of catalyst is recovered in this operation. This catalyst, designated in the following table as catalyst "A," was subjected to a standard catalytic cracking test procedure and the results thereof indicated in the table.

EXAMPLE II

A silica-alumina-magnesia catalyst is prepared by means of the present metathesis reaction in the following procedure: 162 grams (1 mole) of mono-basic aluminum acetate, 89.2 grams of magnesium acetate (½ mole) and 1376 grams (8 moles) of silicon tetra-chloride are charged into a glasslined rotating pressure autoclave which is sealed and charged to a pressure of 50 atmospheres of nitrogen. The autoclave is then heated to approximately 220° C. for 6 hours, allowed to cool and the gases allowed to discharge from the autoclave. The glass liner within the autoclave contains a dry white powder while the space between the liner and the walls of the autoclave contain an amber liquid in which acetone and various chlorine-containing organic compounds are present. The powder is recovered, heated with 500 cc. water at 110° C. under pressure and is then cooled and filtered. The filter cake when dried and heated at 500° C. for 3 hours yields approximately 530 grams of a white, refractory solid containing approximately 9.1% alumina, 3.4% magnesia and approximately 87.3% silica. The silica-alumina-magnesia composite, ground to approximately 30 mesh size particles, is designated as catalyst "B" in the following table listing its physical and catalytic properties as determined in the standard catalytic cracking test procedure.

EXAMPLE III

A silica-alumina-boron oxide catalyst composite was prepared by the metathesis reaction between silicon tetra-chloride, mono-basic aluminum acetate, and butylborate in accordance with the following procedure. 172 grams of silicon tetra-chloride (approximately 1 mole), 80 grams of mono-basic aluminum acetate (approx. 0.50 mole) and 40 grams of butylborate (approx. 0.17 mole) are charged into a glass liner and the latter placed in a rotating pressure autoclave and sealed in the autoclave with nitrogen charged to a pressure of 50 atmospheres. The autoclave is then heated while rotating to a temperature of 210° C. for 6 hours, thereafter allowed to cool and the pressure released. The dry white powder contained in the liner from the autoclave is then heated to a temperature of 500° C. for 3 hours in the presence of air yielding approximately 90 grams of slightly tan powder containing approximately 66% silica, 28% alumina and 6% boron oxide. The composite is then crushed to pass a 30 mesh size screen and the resultant particles utilized in a standard catalytic cracking test procedure to determine its activity as a catalytic cracking catalyst. The results of the latter test are given in the following table, the composite being designated as Catalyst "C."

EXAMPLE IV

The catalyst composites prepared as indicated above when tested in accordance with the standard catalytic cracking test procedure produced the results indicated in the following table. In this test, a Mid-Continent gas oil fraction having an A. P. I. gravity of 31.4 and an initial boiling point of approximately 465° F. was passed over a solid bed of the catalyst contained in a furnace maintained at a temperature of approximately 932° F. at a space velocity of approximately 4 volumes of said gas oil fraction per volume of catalyst per hour. The catalyst in each of the tests was on stream for a test period of approximately 2 hours. The liquid hydrocarbon product boiling at a temperature above 400° F. was condensed in a receiver and the gaseous fractions, together with the gasoline product boiling at a temperature below about 400° F., was collected in a separate vessel. The weight percent conversion, expressed as the total weight of 400° F. end point gasoline formed in the conversion and uncondensed gas divided by the weight of the oil charged and the result multiplied by 100 for each of the catalysts on a once-through basis as indicated in the table.

Table
CONVERSION OF GAS OIL TO HYDROCARBONS BOILING BELOW 400° F. IN A CATALYTIC CRACKING PROCESS

| Property | Catalyst A | Catalyst B | Catalyst C |
|---|---|---|---|
| Average Bulk Density of Catalyst (grms./cc.) | 0.33 | 0.29 | 0.23 |
| Weight per cent gasoline in product [1] | 14.8 | 16.1 | 18.2 |
| Weight per cent activity [2] | 59 | 76 | 98 |

[1] Determined as the weight of liquid product boiling below 400° F. divided by the weight of gas oil charged multiplied by 100.
[2] Weight per cent conversion for the test catalyst compared to a standard silica-alumina catalyst of 100 weight per cent activity.

I claim as my invention:

1. A process for the preparation of a hydrocarbon conversion catalyst comprising a composite of an oxide of an element of group IV of the periodic table and at least one oxide selected from the group consisting of alumina and magnesia which comprises effecting a metathesis reaction between a halide of said group IV element in which the halogen radical has an atomic weight greater than 19 and at least one metal salt selected from the group consisting of the magnesium and aluminum salts of a weakly acidic organic compound selected from the group consisting of fatty acids, aliphatic alcohols and phenols, said reaction being effected at a temperature of at least about 150° C. but below the normal decomposition point of the metal salt.

2. The process of claim 1 further characterized in that said group IV halide is selected from the halides of silicon, titanium, zirconium, cerium, hafnium, and thorium in which the halogen radical thereof has an atomic weight greater than 19.

3. The process of claim 1 further characterized in that said group IV halide and said metal salt are reacted at a temperature of from about 150° to about 300° C. at a pressure sufficient to maintain the reactants in substantially liquid phase.

4. The process of claim 1 further characterized in that said group IV halide is reacted with said metal salt in admixture with an alcohol ester of boric acid.

5. The process of claim 4 further characterized in that said ester is a boron alkoxide.

6. A process for the preparation of a hydrocarbon conversion catalyst comprising a composite of an oxide of an element of group IV of the periodic table and at least one oxide selected from the group consisting of alumina and magnesia which comprises effecting a metathesis reaction at a temperature of from about 150° C. to about 300° C. between a halide of said group IV element in which the halogen has an atomic weight greater than 19 and at least one metal salt selected from the group consisting of the magnesium and aluminum salts of a weakly acidic organic compound selected from the group consisting of fatty acids, aliphatic alcohols and phenols, thereafter heating the resulting solid product in the presence of water at a temperature of at least 100° C. and heating the resulting composite of metal oxides at a temperature of from about 300° to about 800° C.

7. The process of claim 6 further characterized in that said group IV halide is a silicon halide.

8. The process of claim 7 further characterized in that said silicon halide is silicon tetrachloride.

9. The process of claim 6 further characterized in that said metal salt is aluminum acetate.

10. The process of claim 6 further characterized in that said group IV halide is reacted with said metal salt in admixture with an alcohol ester of boric acid.

11. The process of claim 10 further characterized in that said ester is butylborate.

12. A process for the preparation of a hydrocarbon conversion catalyst which comprises effecting a metathesis reaction between a halide of an element of group IV of the periodic table in which the halogen radical has an atomic weight greater than 19 and at least one metal salt selected from the group consisting of magnesium and aluminum fatty acid salts at a temperature of at least about 150° C. but below the normal decomposition temperature of the metal salt.

13. A process for the preparation of a hydrocarbon conversion catalyst which comprises effecting a metathesis reaction between a halide of an element of group IV of the periodic table in which the halogen radical has an atomic weight greater than 19 and at least one metal salt selected from the group consisting of magnesium and aluminum acetates at a temperature of at least about 150° C. but below the normal decomposition temperature of the metal salt.

14. A process for the preparation of a hydrocarbon conversion catalyst which comprises effecting a metathesis reaction between a halide of an element of group IV of the periodic table in which the halogen radical has an atomic weight greater than 19 and at least one metal salt selected from the group consisting of magnesium and aluminum alkoxides at a temperature of at least about 150° C. but below the normal decomposition temperature of the metal salt.

15. A process for the preparation of a hydrocarbon conversion catalyst which comprises effecting a metathesis reaction between a halide of an element of group IV of the periodic table in which the halogen radical has an atomic weight greater than 19 and at least one metal salt selected from the group consisting of magnesium and aluminum phenolates at a temperature of at least about 150° C. but below the normal decomposition temperature of the metal salt.

JAMES P. WEST.

REFERENCES CITED

The following references are of record in the file of this patent:

UNITED STATES PATENTS

| Number | Name | Date |
|---|---|---|
| 2,206,021 | Blunck | July 2, 1940 |
| 2,317,803 | Reeves et al. | Apr. 27, 1943 |
| 2,422,884 | Burgin | June 24, 1947 |